July 9, 1940.　　P. H. SMITH ET AL　　2,207,522
CONCENTRIC CONDUCTOR TRANSMISSION LINE
Filed March 24, 1938
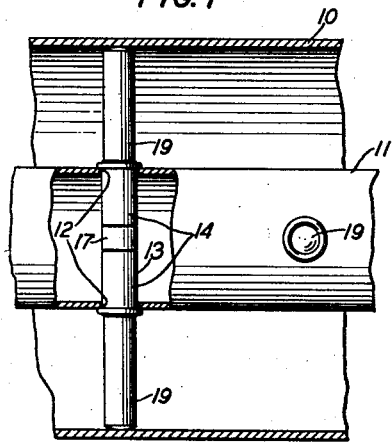
FIG. 1
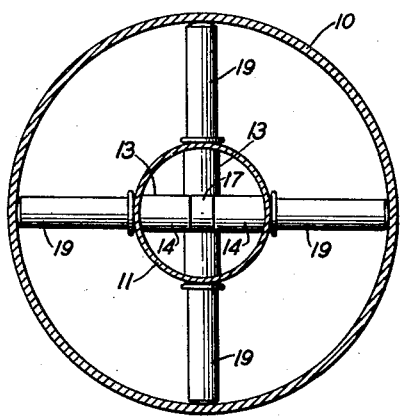
FIG. 2
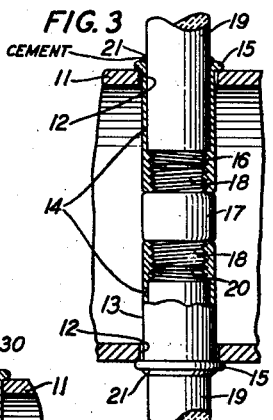
FIG. 3
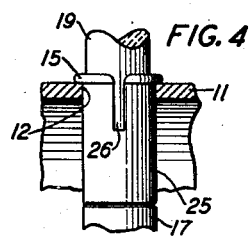
FIG. 4
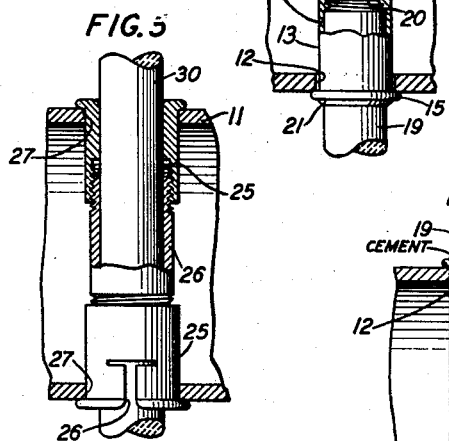
FIG. 5　　FIG. 7
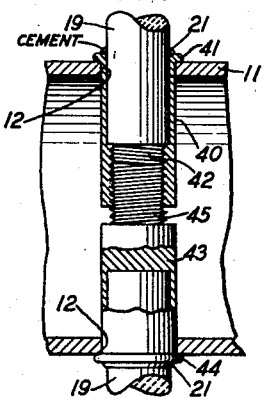
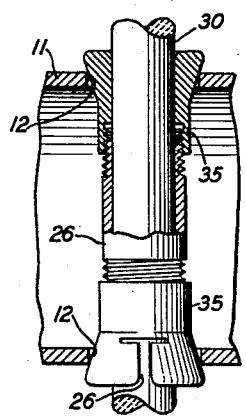
FIG. 6
INVENTORS: P. H. SMITH
M. A. SPECHT
BY
H. A. Burgess
ATTORNEY Patented July 9, 1940

2,207,522

UNITED STATES PATENT OFFICE 2,207,522

CONCENTRIC CONDUCTOR TRANSMISSION LINE

Phillip H. Smith, Denville, and Malcolm A. Specht, Tenafly, N. J., assignors to Bell Telephone Laboratories, Incorporated, New York, N. Y., a corporation of New York Application March 24, 1938, Serial No. 197,766

3 Claims. (Cl. 174—28)

This invention relates to concentric conductor transmission lines, and more particularly to arrangements for retaining concentric spacing between the conductors of such lines.

One form of concentric conductor line known heretofore comprises a tubular inner conductor disposed in a tubular outer conductor and spaced concentrically therefrom by insulating rings or the like mounted on the periphery of the inner conductor at intervals therealong. In such arrangement insulating rings are held in place on the inner conductor in one of the following ways: (a) friction, (b) crimping the inner conductor on both sides of the insulating ring, (c) soldering metal rings on the inner conductor or both sides of the insulating ring and (d) springing resilient wires on the inner conductor on both sides of each insulator.

Accordingly, these insulating rings create gaps between themselves and the inner conductor along a radial extending from the center of the line and, in addition, introduce between the inner and outer conductors a relatively large mass of material which has a high dielectric constant compared to air or gas surrounding it and which, in addition to increasing the dielectric losses that are proportional to the mass of this material, alters the distribution of the voltage gradient on the outer surface of the inner conductor. This distribution would be uniform for a line assumed to have a uniform air or gas dielectric intervening exclusively between the inner and outer conductors, or a line provided with insulators having a dielectric constant equivalent to that of the surrounding air or gas, if such were possible. However, since a solid material having a dielectric constant equivalent to that of air or gas is physically non-existent, the nearest approach to the desired condition of a uniform air or gas dielectric is realized with an insulator having minimum mass.

These alterations in the distribution of voltage gradient cause substantial increases of voltage gradient in the vicinity of the insulating rings and frequently result in the production of relatively steep voltage gradients on the outer surface of the inner conductor, particularly if any gaps intervene between the inner conductor and the insulating rings. Consequently, there may be produced in the vicinity of the insulating rings corona and flashover by signaling voltages applied to the line and having magnitudes substantially less than those that would be transmitted by a concentric line of the same cross-sectional dimensions and having air or gas dielectric intervening exclusively between the inner and outer conductors.

Also it may happen that either in slipping the outer conductor onto the inner conductor or in handling an assembled concentric conductor line in the field the insulating rings would be subjected to longitudinal displacement on the inner conductor. Such movement tends to change the concentric relation between the inner and outer conductors, thereby causing further variation in the distribution of the voltage gradient on the outer surface of the inner conductor.

Concentric conductor lines may be used in the transmission of high-frequency signals in the manner disclosed in the patent of L. Espenschied et al. No. 1,835,031, issued December 8, 1931.

It is an object of the invention to provide a concentric conductor system which, for a given cross-section and conductor diameter ratio, allows efficient transmission of maximum signaling voltages, substantially equivalent to those that could be transmitted by a concentric conductor system of the same dimensions but embodying ideal insulating arrangements.

It is another object of the invention to provide a concentric conductor transmission line having highly efficient insulation for the transmission of signaling currents embracing a wide band of frequencies.

It is still another object of the invention to provide a concentric transmission line that can be expeditiously assembled in both factory and field, and therefore one that is relatively inexpensive to manufacture.

It is a further object of the invention to provide a concentric conductor transmission line in which there is a minimum disturbance to the air or gas dielectric intervening between the inner and outer conductors.

It is a still further object of the invention to provide a concentric conductor line in which concentric spacing is substantially maintained at all points thereof.

In a preferred form of the invention comprises a concentric conductor line in which the inner conductor is provided with a plurality of pairs of diametrically aligned openings spaced longitudinally therealong in such manner that adjacent pairs are angularly disposed relative to each other. Extending between associated openings is a tubular support arranged to detachably mount complementary insulating members utilized to retain concentric spacing between the inner and outer conductors.

The invention will be more readily understood from the following description taken together with the accompanying drawing in which:

Fig. 1 is a sectional view of a concentric conductor illustrating one form of the invention;

Fig. 2 is an end view of Fig. 1;

Fig. 3 is an enlarged sectional view showing assembly of support for complementary insulators;

Fig. 4 is an enlarged sectional view delineating a modification of the insulator support shown in Fig. 3;

Figs. 5 and 6 are enlarged sectional views illustrating assemblies of supports for unitary insulators; and Fig. 7 is an enlarged sectional view showing an alternative form of the invention disclosed in Fig. 3.

In the following description the same reference numerals are employed to designate the same elements appearing throughout the several views.

Fig. 1 illustrates a concentric conductor comprising outer conductor 10 and inner conductor 11, the latter being provided with a plurality of pairs of diametrically aligned openings 12, 12 preferably having the same diameters and spaced at intervals along the longitudinal axis thereof. Adjacent pairs of openings 12, 12 are angularly disposed at 90 degrees relative to each other, although it is understood that this disposition can also be 120 degrees, or any desired amount. Extending between associated openings 12, 12 is a support 13 comprising two tubular members 14, 14 each of which is formed on one end with an annular bead 15 to engage the outer surface of the inner conductor and on the opposite end with an internally threaded portion 16 as shown in Fig. 3. Preferably the bead 15 embodies a configuration that substantially conforms with the contour of the inner conductor so as to eliminate metallic protuberances on the inner conductor surface greater than the diameter of the beading in the vicinity of the openings 12, 12. A link 17 provided on both ends with threaded portions 18, 18 accommodable in the internal threads 16 unites the members 14, 14 to constitute the integral support 13.

Serving to retain concentric relation between the inner and outer conductors is an insulating arrangement comprising complementary members 19, 19 each of which is so disposed in one of the tubular members 14, 14 that one end rests on an annular shoulder 20 formed internally thereof and adjacent the inner end of the thread 16, and the opposite end engages the inner surface of the outer conductor, the complementary insulating members 19, 19 engaging the inner surface of the outer conductor on diametrically opposite points thereof. The ends of the insulating members 19, 19 engaging the outer conductor are preferably rounded so as to substantially provide point-contact therewith.

The internal diameters of the members 14, 14 are preferably arranged so that sufficient clearance is allowed for the purpose of suitably cementing the insulating members 19, 19 therein. In this connection a cement-fillet 21 is provided in the space intervening between each bead 15 and insulator 19 to supplant air dielectric. This serves to increase flashover voltage, that is, the voltage required to produce a spark-discharge between the inner and outer conductors.

Fig. 4 shows a modification of the arrangement disclosed in Fig. 3 and comprises a tubular member 25 including a pair of slots 26, 26 provided in diametrically opposite sections and extending from the annular bead 15. As insulator 19 is inserted into the member 19, the slotted end of the latter is outwardly flexed thereby providing satisfactory electrical contact between the member 25 and the insulator 19. This structure obviates the use of cement.

Fig. 5 delineates a modification of the arrangement shown in Figs. 1 and 4, and comprises a unitary insulator 30 extending between tubular members 25, 25 united by a tubular link 26 in which the unitary insulator 30 is thoroughly cemented. Also, openings 27, 27 are provided with diameters that are slightly smaller than the outside dimension of the tubular members 25, 25. As the members 25, 25 are drawn together by the tubular link 26 for seating in the openings 27, 27, the smaller diameters of the latter cause an inward flexing of the ends of the members 25, 25 embodying slots 26, 26. This serves to provide intimate contact between the members 25, 25, and the insulator 30, thereby avoiding the use of cement except in connection with the tubular link 26 mentioned above.

Fig. 6 illustrates a modification which is identical with that shown in Fig. 5 except the ends of tubular members 35, 35 embodying the slots 26, 26 are formed with a wedge-shaped configuration. This serves to provide intimate contact between insulator 30 and the tubular members 35, 35 as the latter are seated in openings 12, 12.

Fig. 7 shows supporting means which omits link 17 (Figs. 1 and 3) and comprises a tubular member 40 formed preferably on one end with an annular bead 41 for engaging the outer surface of the inner conductor and on the opposite end with an internally threaded portion 42, and also a tubular member 43 formed preferably on one end with an annular bead 44 for engaging the outer surface of the inner conductor and on the opposite end with an externally threaded portion 45. The tubular members 40 and 43 are operatively associated in each pair of aligned openings 12, 12 by screwing externally threaded portions 45 into internally threaded portions 42. It is obvious that the beaded ends of the members 40 and 43 can be replaced by the wedge-shaped configuration shown in Fig. 6. Insulators may be cemented in the tubular members 40 and 43 to provide adequate contact therebetween, or the latter provided with slots 24 as is shown in Fig. 4 for the same purpose.

In the above arrangements it is evident that the insulators are precluded from longitudinal displacement on the inner conductor in the operations of (a) slipping the outer conductor onto the inner conductor and (b) handling an assembled concentric conductor line in the field. Consequently, concentric relation between the inner and outer conductors will be retained at all points thereof.

In addition, pin-type insulators with their minimum mass of high dielectric material intervening between the inner and outer conductors tend to cause minimum dielectric losses and also minimum disturbances in the distribution of the potential gradient on the outer surface of the inner conductor. This together with the elimination of gaps between the insulators and inner conductor along a radial extending from the center of the line and the substantial reduction of air or gas dielectric between the inner conductor and the individual pin-type insulators, due to tight fit of insulators in associated openings in inner conductor, obviates the production of relatively steep voltage gradients on the outer surface of the inner conductor in the vicinity of the insulators. Consequently, signaling voltages that are substantially equivalent in magnitude to voltages allowed by a line of the same size having air or gas dielectric intervening exclusively between the inner and outer conductors, or an air or gas dielectric line of the same size provided with ideal insulators for maintaining concentric spacing therebetween, may be applied to the line without causing the production of corona or flashover, and therefore may be transmitted thereover with increased efficiency.

Furthermore, it is evident that a pin-type insulating arrangement of the character described above lends itself to the facile assembly of a concentric conductor line or the expeditious replacement of defective insulators. In the latter event a defective insulator can be removed and replaced without disturbing the other insulators which is not so in the case of ring-type insulators as all insulators leading to the defective one must be removed before the latter can be replaced.

While the invention is particularly described in connection with a concentric conductor line having a tubular inner conductor, it is obvious that it is equally well-suited to concentric conductor lines provided with solid inner conductors.

It is understood that the invention is capable of modifications other than those disclosed herein, and the scope thereof together with such modifications is defined in the appended claims.

What is claimed is:

1. In a concentric conductor transmission line comprising a tubular outer conductor in which is disposed an inner conductor, said inner conductor having a plurality of pairs of diametrically aligned openings spaced at intervals therealong in such manner that adjacent pairs are angularly disposed relative to each other, supporting means extending between the openings in each of said pairs and comprising two tubular members disposed in an opposite manner and means to secure said tubular members to the inner conductor, and elongated insulating means positioned in said supporting means such that adjacent ends are positioned in the tubular members and opposite ends engage diametrically opposite points on the inner surface of the outer conductor for retaining concentric relation between the inner and outer conductors.

2. In a concentric conductor transmission line comprising tubular inner and outer conductors, said inner conductors having a plurality of pairs of diametrically aligned openings spaced at intervals therealong in such manner that adjacent pairs are angularly disposed relative to each other, supporting means extending between the aligned openings of each pair and comprising two oppositely disposed tubular members each of which is formed on one end with an annular bead to engage the outer surface of the inner conductor and on the opposite end with an internally threaded portion, and a link having externally threaded portions on both ends accommodable in said internally threaded portions to unite said tubular members; and insulating means mounted in said supporting means for retaining concentric relation between the inner and outer conductors and comprising complementary elongated insulators each of which has one end disposed in one of said tubular members and the opposite end engaging the inner surface of the outer conductor, said complementary members engaging the outer conductor on diametrically opposite points thereof.

3. In a concentric conductor transmission line comprising tubular inner and outer conductors, said inner conductor having a plurality of pairs of diametrically aligned openings spaced at intervals therealong in such manner that adjacent pairs are angularly disposed relative to each other, supporting means extending between aligned openings of each pair and comprising a pair of oppositely disposed tubular members, one tubular member including on one end an annular bead to engage the outer surface of the outer conductor and on the opposite end an internally threaded portion, the other tubular member embodying on one end an annular bead to engage the outer surface of the outer conductor and on the opposite end an externally threaded portion, said externally threaded portion being accommodable in said internally threaded portion to operatively associate said tubular members; and insulating means mounted in said supporting means for retaining concentric relation between the inner and outer conductors and comprising complementary elongated insulators each of which has one end disposed in one of said tubular members and the opposite end engaging the inner surface of the outer conductor, said complementary members engaging the outer conductor on diametrically opposite portions thereof.

PHILLIP H. SMITH.
MALCOLM A. SPECHT.